Figure 1:
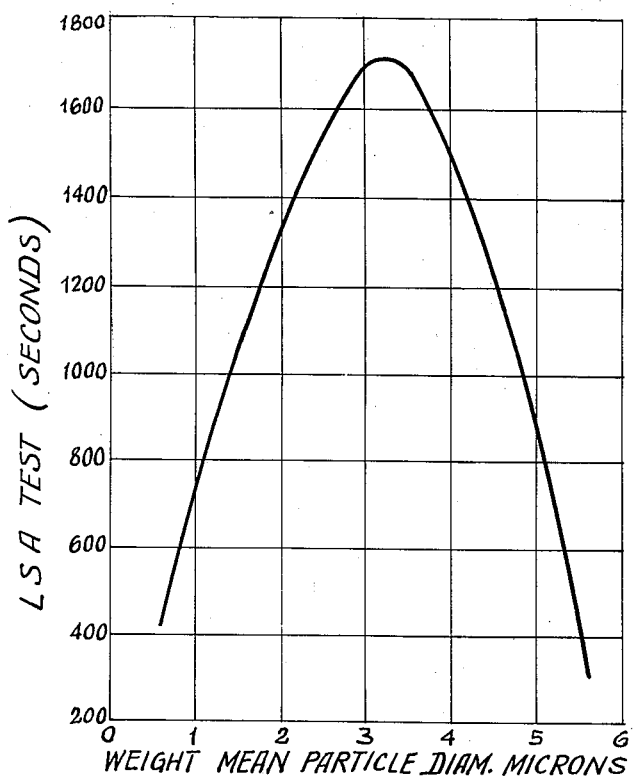

Dec. 13, 1960 R. H. CRAMER ET AL 2,964,481
PREPARATION OF ATTRITION-RESISTANT SILICEOUS GELS
Filed May 3, 1957 3 Sheets-Sheet 1

INVENTORS
Robert H. Cramer
Albert B. Schwartz

Raymond W. Barclay
ATTORNEY

INVENTORS
Robert H. Cramer
Albert B. Schwartz
Raymond W. Barclay
ATTORNEY

Dec. 13, 1960 R. H. CRAMER ET AL 2,964,481
PREPARATION OF ATTRITION-RESISTANT SILICEOUS GELS
Filed May 3, 1957 3 Sheets-Sheet 3

INVENTORS
Robert H. Cramer
Albert B. Schwartz
Raymond W. Barclay
ATTORNEY

United States Patent Office 2,964,481
Patented Dec. 13, 1960

2,964,481

PREPARATION OF ATTRITION-RESISTANT SILICEOUS GELS

Robert H. Cramer, Woodbury, N.J., and Albert B. Schwartz, Philadelphia, Pa., assignors to Socony Mobil Oil Company, Inc., a corporation of New York Filed May 3, 1957, Ser. No. 656,781

7 Claims. (Cl. 252—455)

This invention is concerned with a process for producing siliceous gels characterized by a high resistance to attrition. More particularly, the present invention is directed to an improved method for preparing gels wherein silica is the sole or major component. Such gels find use as adsorbents, desiccants, catalysts, catalyst supports, carriers and in various other applications where rigidity and ability to withstand abrasion upon handling are considered desirable attributes.

Modern catalytic processes require catalysts which are not only specifically active in the chemical reactions which are to be catalyzed but also possess physical characteristics required for successful commercial operation. One of the outstanding physical attributes of a commercial catalyst is hardness, i.e., the ability to resist attrition. The ability of a particle to hold its shape in withstanding the mechanical handling to which it is subjected upon storage, shipment, and use is a primary requirement for a successful catalyst and for modern catalytic processes.

Thus, many operations for the conversion of hydrocarbon materials are carried out in the presence of silica-containing gels which themselves have a catalytic effect or which are impregnated with or act as a support for other catalytic material of a nature appropriate to the result desired. These catalytic processes are generally advantageously carried out employing methods wherein the catalyst or contact mass is subjected to continuous handling. In such operations, a continuously moving stream of hydrocarbon feed is contacted with a continuously moving stream of catalyst for the accomplishment of conversion and thereafter the catalytic material is continuously regenerated and returned to the conversion zone. This continuous handling and regeneration of the catalyst particles results in considerable breakage and constant abrasion, consuming the catalyst and giving rise to an excessive amount of fines which are a loss since they generally cannot be re-used in the same catalytic equipment. Furthermore, there is a tendency for the catalyst fines suspended in the gas or vapor present to act as an abrasive in a manner analogous to sand blasting. This not only wears away the equipment but also causes the catalyst to take up foreign matter detrimental to its catalytic properties. A hard, porous siliceous gel catalyst, having the ability to withstand abrasion during the necessary handling involved during continual conversion and regeneration, is definitely desirable in overcoming the aforementioned disadvantages.

Likewise, in those instances where advantage is taken of the adsorbent or desiccant characteristics of siliceous gels, it is highly desirable to employ a gel having the ability to resist attrition and thereby obviate contamination of the material undergoing treatment with gel fines. This is particularly the case where desiccant gel particles are tumbled or otherwise agitated in direct contact with the material being treated.

Siliceous gels such as silica, silica-alumina, silica-magnesia, silica-zirconia, silica-thoria, silica-beryllia, silica-alumina-magnesia, silica-alumina-zirconia, etc., employed in the above and various other operations have generally been prepared by the formation of a sol of desired composition that sets to a hydrogel after lapse of a suitable period of time. The hydrogel is then dried to remove the liquid phase therefrom.

It has heretofore been suggested that various finely divided water-insoluble solids be added to the sol before the same undergoes gelation for the purpose of increasing the porosity of the ultimate dried gel so that the regeneration characteristics thereof are enhanced upon use in catalytic hydrocarbon conversion operations. The improved regeneration characteristics obtained with the aforementioned gels have been attributed to the fact that the finely divided solid contained in the hydrosol does not shrink to the extent that the hydrogel does during drying, thereby creating in the resulting dried gel a large number of macropores. While the gels so prepared, containing pulverized material of appreciable particle size, exhibit improvement in regeneration, the physical strength thereof has been weakened due to the presence of large pores in the gel. Specifically, resistance to attrition of such gels has been found to be distinctly less than that of a comparable gel in which the foregoing pulverized material was absent.

Gel preparation has heretofore been carried out by drying hydrogel in a mass, which is subsequently broken up into pieces of desired size. Hydrogel has also been prepared and dried in the form of small pieces of predetermined shape such as obtained by extrusion, pelleting, or other suitable means. In more recent years, gels have been produced in the form of spheroidal bead-like particles. The latter have had the advantage over irregularly shaped gel particles and over those obtained by extrusion or pelleting by being more resistant to attrition. However, since further improvement in resistance to attrition of gel beads, as well as other forms of gel, is a distinct advantage in commercial operation, serving to reduce the over-all operating costs of a process utilizing the same, a method for increasing the attrition resistance generally of siliceous gels is highly desirable. The incorporation of finely divided solids of the type referred to hereinabove in the hydrosol used for the formation of gel beads has been found to undesirably decrease the hardness characteristics thereof, rendering the gel beads so produced susceptible to attrition.

A major object of this invention accordingly is to provide a process for producing a siliceous gel of improved hardness. A further object is to provide a process for preparing attrition-resistant spheroidal gel siliceous particles. A still further object is the provision of a commercially feasible process for producing silica-containing gels having unusual resistance to attrition. Other objects and advantages of the invention will be apparent to those skilled in the art from the following description.

In accordance with the present invention, there is provided a method for preparing a siliceous gel having improved resistance to attrition, which comprises mixing a water-insoluble powder having a weight mean particle diameter of between 1 and 5 microns and preferably between 2 and 4 microns with an alkali metal silicate solution, maintaining contact between the silicate solution and introduced powder under controlled correlated conditions of time and temperature, thereafter effecting gelation of the resulting mixture by the addition of an acidic solution and drying the hydrogel so obtained at a temperature below the fusion point of the introduced powder. It has been found that the gelation time and attrition resistance of the resultant gel is affected by the time and temperature of contact of the fine powder and alkali metal silicate solution prior to gelation thereof, as well as the particle size of the introduced powder. More specifically, it has been discovered that if the contact time between alkali metal silicate solution and introduced fine powder having the above specified weight mean particle diameter is of insufficient duration, the attrition resistance of the resulting siliceous gel suffers as well as the diffusion properties thereof. In addition, when the above technique is employed in making siliceous gel in bead form, it has been found that the whole bead yield decreases if contact time between the fine powder and alkali metal silicate solution is too short. On the other hand, it has been found that if the contact time is unduly long, the attrition resistance of the resulting siliceous gel is reduced. It has further been found that, as the contact temperature is increased, contact time must be decreased in order to achieve the desired attrition resistance. Also, the gelation time is reduced upon prolonged contact of alkali metal silicate and fine powder so that it is difficult to prepare bead hydrogel. The whole bead yield likewise decreases if contact between the alkali metal silicate reactant and fine powder is extended beyond an appropriate period.

Thus, it has been established that the time and temperature of contact between the fine powder and the alkali metal silicate solution have a distinct and direct effect on the attrition resistance, the gelation time, and the whole bead yield of the resulting siliceous gel product. It has been found, in accordance with this invention, that the alkali metal silicate solution and the added fine powder having a weight mean particle diameter of 1 to 5 and preferably 2 to 4 microns should be maintained in contact for a time of between .001 and 5 hours and a temperature of between 50° F. and 110° F. Preferably, the alkali metal silicate solution is initially mixed with a fine powder having the above weight mean particle diameter and contact between the alkali metal silicate solution and powder is maintained for a period of between .005 and 1 hour at a temperature in the approximate range of 70° F. to 90° F., such time and temperature of contact being correlated to lie within the area ABCD of Fig. 5 of the accompanying drawing. Thereafter, gelation of the alkali metal silicate solution is effected by the addition thereto of an acidic solution which may contain one or more metal salts, the oxides of such metals being cogelled with silica.

The amount of fine powder contained in the siliceous hydrosol prepared in accordance with the instant process is generally between about 2 and about 40 percent by volume, and preferably between about 15 and about 30 percent by volume, based on the ultimately dried gel. The powder should be substantially insoluble in the sol and should, as indicated hereinabove, essentially have a weight mean particle diameter of between 1 and 5 microns and preferably between 2 and 4 microns.

The powdered material may be added continuously in the form of an aqueous slurry to the alkali metal silicate solution and the resulting mixture passed into a vessel of suitable size to afford the required contact time. A portion of the mixture may be continuously withdrawn from the storage vessel and pumped to a mixing nozzle wherein it is brought into intimate contact with an acid solution for effecting gelation. As an alternate, the powder and alkali metal silicate solution may be mixed batchwise and the mixture aged for the requisite contact time. The aged mixture may thereafter be contacted with an acid solution to yield a siliceous hydrosol capable of setting to a hydrogel upon lapse of a suitable period of time.

The particle size distributions of the powders mixed with alkali metal silicate solution in accordance with the present process were determined by sedimentation methods. The weight mean particle diameters were determined by plotting the cumulative percent of powdered material smaller than a given diameter against particle diameter, dividing the total size range into a number of small fractions and calculating as follows:

$$\text{Weight mean diameter} = \frac{\sum d_i g_i}{\sum g_i}$$

whereas $d_i$ is the mean particle size of the fraction in microns and $g_i$ is the corresponding weight percent material in the fraction. The percent volume fines in the dried gel was calculated from the particle densities of powdered material, i.e., the density of the material excluding void space between the particles but including pore volume of the particles and of dried gel which contained no added powder. In addition to having the above-noted critical particle size, the powdered solid mixed with the alkali metal silicate solution should necessarily be substantially insoluble in the resulting siliceous hydrosol and should further be characterized by being infusible at the hydrogel drying temperature. The form of hydrogel is generally maintained substantially constant from a time prior to gelation until after the gel has been dried. During drying, the hydrogel undergoes considerable shrinkage. The extent of drying in accordance with the present procedure will depend somewhat on the use which it is desired to make of the product but, in any event, the drying is carried to a stage beyond that at which maximum shrinkage of the gel is obtained. The gel, after syneresis or shrinkage thereof has been completed, is substantially dry, i.e., the gel possesses open pores free of liquid although it still contains a relatively small percentage of water, which is evolved upon subjecting the gel to a relatively high temperature. Hydrogel containing fine powder dispersed therein, prepared as in the present process, may be dried at room temperature or at higher temperatures in air or steam, as well as in various inert or reducing atmospheres. While the prepared hydrogel may be dried at ambient temperature by merely exposing to the air, it is preferred to accelerate the removal of liquid phase from the hydrogel by drying at a temperature in the range of about 150° F. to about 400° F. until shrinkage of the hydrogel is substantially complete. Drying may be carried out in air or superheated steam. To impart maximum attrition resistance to the gel, it is further preferred to subject the dried gel to calcination in an inert gas, air, steam, or mixtures thereof at a temperature below that at which sintering is encountered and, in general, of the approximate range of 1150° F. to 1400° F. for a period of about 1 hour or more, generally from about 1 to about 24 hours. It is to be understood that the present process is applicable in imparting hardness characteristics to gels which have been dried to the point of maximum shrinkage and which may thereafter undergo the described further drying and/or calcining treatment. In every instance, at a comparable stage of drying or thermal treatment, the gel containing the powdered material described herein was harder than a gel containing pulverized material of larger particle size or gel prepared in the absence of added material. Thus, the improvement in resistance to attrition is obtained both in the case of gels which had been merely dried and in the case of gels which had undergone calcination. The latter gels, however, exhibited optimum hardness and it is accordingly preferred to subject the gels prepared as described herein to a final calcination treatment.

The powder mixed with the alkali metal silicate in accordance with the present invention may be catalytically active or an inert material. The particular chemical composition of the powder does not appear to be significant insofar as its ability to impart attrition resistance to the ultimate gel is concerned. It is essential that the powdered material (1) have a weight mean particle diameter of between 1 and 5 microns and preferably between 2 and 4 microns, (2) be substantially insoluble in the resulting siliceous sol, and (3) be infusible at the temperature of drying the hydrogel and at the temperature of calcination where such latter treatment is employed. It is also essential, following the teachings of this invention that the fine powder be maintained in contact with the alkali metal silicate solution for a time of between .001 and 5 hours and a temperature of between 50° F. and 110° F. and particularly under conditions of time and temperature lying within the area ABCD of Fig. 5 of the accompanying drawing.

The reason for the unusual hardness characteristics of the siliceous gels prepared in accordance with the present process is not known with certainty. It would appear, however, that some cementation or hardening takes place during the setting and/or drying of the hydrogel containing the specified powdered material.

The particular powdered material undergoing admixture with the alkali metal silicate solution will be chosen so as to be substantially insoluble in the resulting siliceous hydrosol and to be infusible at the drying temperature. Suitable representative materials include dried gels or gelatinous precipitates, such as those of silica, alumina, magnesia, chromia, molybdena, zirconia, thoria, titania, and the like, including composites thereof. Other suitable materials are sand; clay; graphite; carbon black; metals, including aluminum, titanium, vanadium, iridium, iron, cobalt, manganese, ruthenium, platinum, silver, nickel, osmium, palladium, copper, beryllium, cerium, boron, gold, magnesium, molybdenum, silicon, zirconium, and thorium; oxides, including aluminum oxide, antimony oxide, barium oxide, beryllium oxide, chromic oxide, copper oxide, nickel oxide, ferric oxide, ferrous oxide, titanium oxide, manganese oxide, cadmium oxide, bismuth trioxide, calcium oxide, molybdenum oxide, phosphorus pentoxide, zinc oxide, magnesium oxide, zirconium oxide, vanadium oxide, stannic oxide, stannous oxide, and silicon oxide in its various forms, including cristobalite and quartz. Also, a variety of metal salts which are characterized by insolubility in the siliceous hydrosol and infusibility at the drying temperature may be utilized. Particular preference is accorded inorganic oxide gel powders and especially powdered siliceous and aluminous gels due to the ease of preparation, ready availability and inexpensiveness of these materials.

The process of the invention may be carried out on a batch or continuous basis. Thus, the siliceous hydrosol formed containing powdered solid of the type described hereinabove may be conducted into setting tubs and allowed to remain therein for a sufficient time to effect gelation, after which the resulting hydrogel is removed, broken up into pieces of desired size, base-exchanged if necessary or desirable, and washed to remove soluble material therefrom. The washed hydrogel is thereafter dried and if desired calcined at elevated temperature. The instant process, as indicated above, has been found to be particularly useful for the production of gel in the form of spheroidal particles. The hydrosol containing powdered material produced in accordance with the process of this invention may be made into spheroidal particles by any feasible process such as described in patents to Marisic, for example, U.S. 2,384,946. Broadly, such methods involve introducing globules of hydrosol into a column of water-immiscible liquid, for example, an oil medium, wherein the globules of hydrosol set to a hydrogel and subsequently pass into an underlying layer of water from which they are sluiced to further processing operations, such as hydrothermal treatment, base exchange, water-washing, drying, and calcining.

The resulting hydrogel may, if desired, be initially subjected to a hydrothermal treatment, i.e., contacting the hydrogel with water at an elevated temperature for a specified period of time. Such treatment, however, is not considered essential to the success of the present process of affording a hard attrition-resistant gel. The hydrogel is thereafter water-washed to remove soluble material. In those instances where it is desirable to remove zeolitic alkali metal introduced into the hydrogel through use of the alkali metal silicate reactant, the hydrogel may be base-exchanged with a suitable aqueous solution before water-washing. The base exchange solution may be one capable of replacing zeolitic alkali metal without the introduction of an additional metal or metal compound in the hydrogel, such as a solution of an ammonium salt or an acid. By using a base exchange solution of a metal salt other than a metal already contained in the hydrogel, it is possible to introduce quantities of an additional metal oxide into the hydrogel composite. The incorporation of such additional metal oxide into the hydrogel may desirably act as a catalytic promoter under particular reaction conditions. After water-washing free of soluble material, the resulting hydrogel containing the powdered material is dried and, if desired, subsequently calcined to yield a high attrition-resistant siliceous gel.

The alkali metal silicate reactant employed in the preparation of the present siliceous gels is generally sodium silicate but it is contemplated that other alkali metal silicates, such as potassium silicate, may likewise be used. The alkali metal oxide to silica ratio of the alkali metal silicate, for example, in sodium silicate the $Na_2O/SiO_2$ ratio, is an important factor influencing the contact time to be employed. Generally, the greater the ratio of alkali metal oxide to silica in the alkali metal silicate reactant, the less is the contact time between added powder and alkali metal silicate solution required to give comparable results, assuming, of course, that the minimum contact time specified hereinabove is observed. The ratio of alkali metal oxide to silica in the alkali metal silicate reactant employed in the present process should desirably be in the range of 1/1.6 to 1/3.8. A particularly preferred alkali metal silicate reactant is one having an alkali metal oxide to silica ratio of about 1/3.2. Thus, use of a sodium silicate solution having an $Na_2O/SiO_2$ ratio of 1/3.22 gave excellent results. The concentration of alkali metal silicate solutions employed in the present process is generally such that the silica content thereof is between about 5 percent and about 30 percent by weight.

The intermediate hydrogel state obtained in preparation of present gels is to be distinguished from a gelatinous precipitate. True all-embracing hydrogels occupy the entire volume of the solution from which they are formed and possess a definitely rigid structure. When fractured, a dried hydrogel shows a conchoidal fracture as compared to an irregular, ragged edge fracture observed in the case of gelatinous precipitates. The latter, moreover, occupy only a part of the volume of the solution from which they are formed and have no rigidity of structure. In addition, hydrogels can generally be more easily washed free of soluble impurities due to the tendency of gelatinous precipitates to peptize on washing. A distinct and further advantage of hydrogels is that, due to their rigid structure, they can be formed into high quality spheroidal particles.

The attrition characteristics of the gels prepared in accordance with the method described herein were determined by an attrition test known as the Lauson Shaker Attrition (LSA) Test. The procedure used in the test consists of shaking a 50 cc. sample of the product to be tested in a closed steel cup which is bolted to the piston of a motor-driven Lauson engine which operates at 1000 r.p.m. After shaking for a time sufficient to produce 10 weight percent fines capable of passing through an 8-mesh (Tyler) screen, the sample is screened, weighed, and the percent loss is calculated. These operations are repeated until slightly more than half the sample has been reduced to fines. Cumulative losses are plotted against total shaking time for each cycle. The cumulative time in seconds for 50 percent weight of fines is read from the curve and is reported as the Lauson Shaker Attrition. Since the Lauson Shaker Attrition of gels is affected by the density and size of the particles tested, the attrition data reported herein correspond to an apparent density of 0.75 g./cc. to avoid the interference of these variables in correlating the effect of quantity and size of added powdered material on attrition.

The following examples will serve to illustrate the process of the present invention without limiting the same:

Example 1

Silica-alumina gel containing a small amount of chromia was prepared by mixing streams comprising: (1- aluminum sulphate dissolved in an aqueous solution of sulphuric acid, and (2) sodium silicate solution containing finely divided dried silica-alumina gel maintained in contact with the silicate for 2.3 hours at 78° F. The sulphuric acid-aluminum sulphate stream was composed of 3.79 pounds of 96.3 percent sulphuric acid, 7.74 pounds of aluminum sulphate (containing 43 percent weight water), 0.315 pound of potassium chrome alum, and 117 pounds of water. The sodium silicate stream containing silica-alumina gel powder was composed of 48.0 pounds of sodium silicate having an $Na_2O$ to $SiO_2$ ratio of 1:3.22 and a density of 41° Bé, 48.4 pounds of water, and 3.6 pounds of dried silica-alumina gel powder containing approximately 90 percent weight $SiO_2$ and 10 percent weight $Al_2O_3$, and having a weight mean particle diameter of 2.1 microns.

Four hundred thirty cc./min. of the sulphuric acid-aluminum sulphate and 455 cc./min. of the sodium silicate slurry were mixed in a mixing nozzle to form a sol, which set to a hydrogel in 2.3 seconds at 68° F. The sol was formed into spheroidal hydrogel beads by introducing globules of the sol into an oil medium such as described in the aforementioned Marisic patent. The resulting hydrogel particles, having a pH of 8.5 were treated for 12 hours at 85° F. while covered with water. The hydrogel particles were thereafter base-exchanged with an aluminum sulphate solution to remove sodium from the structure of the gel, washed free of soluble salts, dried in superheated steam at 280° F. for 6 hours, and calcined for 3 hours at 1300° F. The resulting gel, which contained 20 percent volume of added powder, had a Lauson Shaker Attrition of 1600 seconds. Gel of the same composition, prepared similar to above, with the exception that no silica-alumina powder was introduced into the sol, showed a Lauson Shaker Attrition of 130 seconds.

A series of siliceous gels prepared according to the procedure of Example 1, but containing introduced powder of varying weight mean particle diameter were produced and tested for physical durability in the Lauson Shaker Attrition Test. The data obtained in such tests are shown graphically in Figure 1 of the attached drawing wherein the LSA Test results showing the time in seconds required to produce 50 weight per cent of fines are plotted against the weight mean particle diameter of introduced gel powder measured in microns. It will be seen from the data of Figure 1 that siliceous gels having a powdered material dispersed therein of weight mean particle diameter of between 1 and 5 microns possess a distinctly greater physical durability than siliceous gels having dispersed therein powder of appreciably larger or smaller size. It will further be evident that maximum resistance to attrition was achieved with a gel product having dispersed therein powder of a weight mean particle diameter of between 2 and 4 microns.

Example 2

Silica-alumina gel containing a small amount of chromia was prepared by mixing an aqueous solution of sodium silicate having a $SiO_2$ content of about 15 percent by weight and a $Na_2O/SiO_2$ ratio of 1/3.22 with an aqueous slurry of silica-alumina gel powder. The silica-alumina gel powder contained approximately 90 weight percent $SiO_2$ and 10 weight per cent $Al_2O_3$ and had a weight mean particle diameter of 2.7 microns. The mixture so prepared contained by weight, 3.6 percent gel powder, 4.3 percent $Na_2O$, 13.9 percent $SiO_2$ and 78.2 percent water. The sodium silicate solution and gel powder were permitted to remain in contact for 2.9 hours at 72° F. and thereafter a stream of the resulting mixture at a rate of 412 cc./min. was mixed in a mixing nozzle with an acidic stream of aluminum sulphate dissolved in an aqueous solution of sulphuric acid flowing at a rate of 418 cc./min. The sulphuric acid-aluminum sulphate stream was composed of 2.9 percent sulphuric acid, 3.5 percent aluminum sulphate, 0.2 percent potassium chrome alum, and 93.4 percent water.

The resulting silica-alumina hydrosol set to a hydrogel in 3.0 seconds at 61° F. The sol was formed into spheroidal hydrogel beads by introducing globules of the sol into an oil medium such as described in the aforementioned Marisic patent. The resulting hydrogel particles, having a pH of 8.4 were treated for 24 hours at 69° F. while covered with water. The hydrogel particles were thereafter base-exchanged with an aluminum salt solution to remove sodium from the structure of the gel, washed free of soluble salts, dried in superheated steam at 280° F. for 2½ hours and calcined for 3 hours at 1300° F. The resulting gel, which contained 20 percent by volume of added powder, had a Lauson Shaker Attrition of 1,340 seconds.

Figure 2:
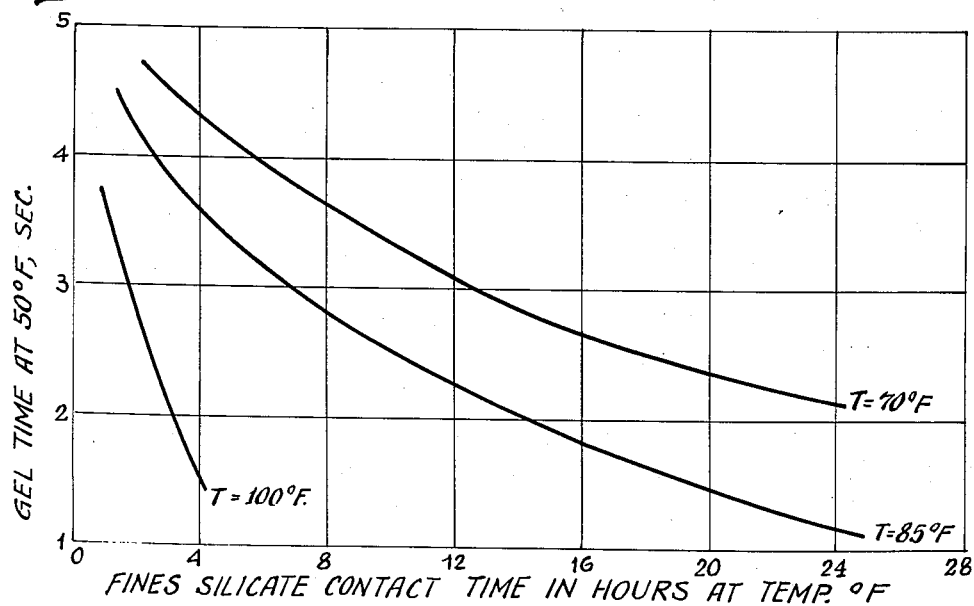

A series of siliceous gels containing introduced powder of weight mean particle diameter in the range of 1 to 5 microns, prepared according to the procedure of Example 2, but under varying conditions of time and temperature of contact between introduced powder and sodium silicate solution, were produced. The temperature and time of contact of powder and sodium silicate solution, gel time, whole bead yield and Lauson Shaker Attrition of the resulting gel products were obtained and are shown graphically in the attached drawing wherein:

Figure 2 shows the effect of gel powder-sodium silicate solution contact time and temperature on gelation time. It will be noted from this figure that gel time decreased with an increase in contact time and also with an increase in contact temperature. It is further to be noted that a very rapid gelation time makes it difficult to prepare bead hydrogel. It is accordingly desirable that contact time and temperature between the added powder and alkali metal silicate solution be sufficient to achieve the desirable characteristics of high resistance to attrition but not sufficiently severe to increase the time of gelation to less than about 3.5 seconds.

Figure 3:
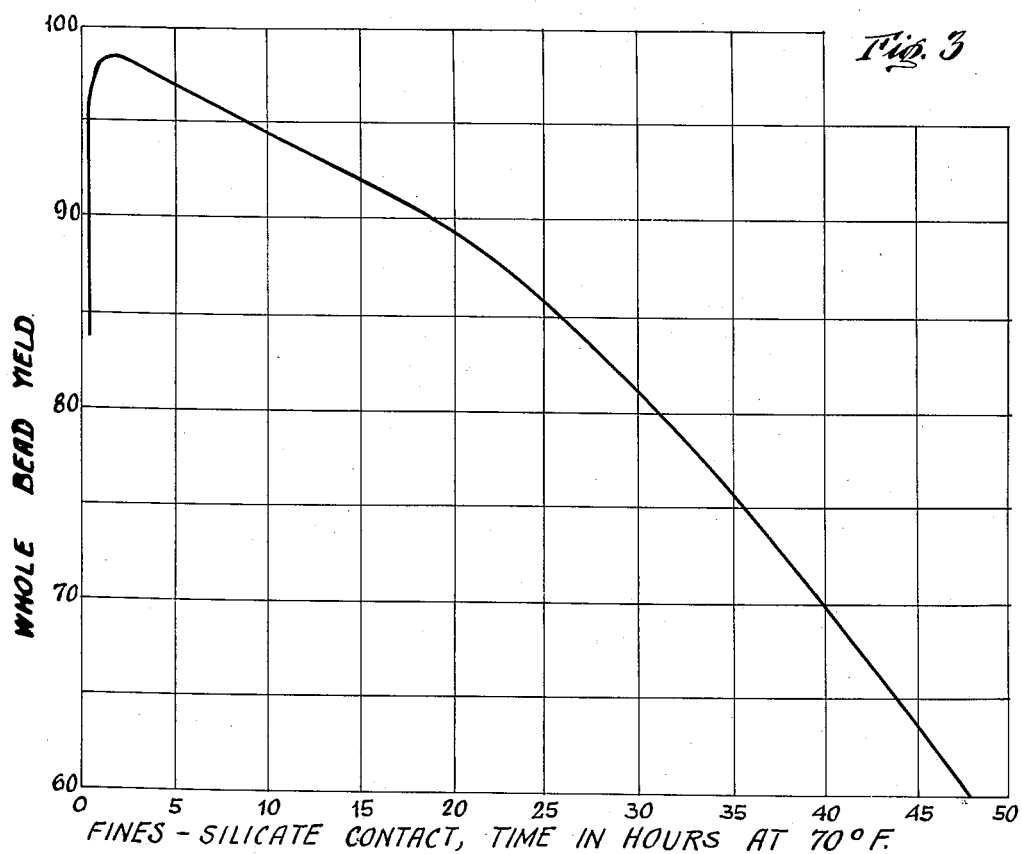

Figure 3 shows the effect of gel powder-sodium silicate solution contact time on whole bead yield. It will be seen from the data of this figure that an optimum yield of whole beads is achieved at the specified temperature with a contact of slightly less than 1 hour.

Figure 4:
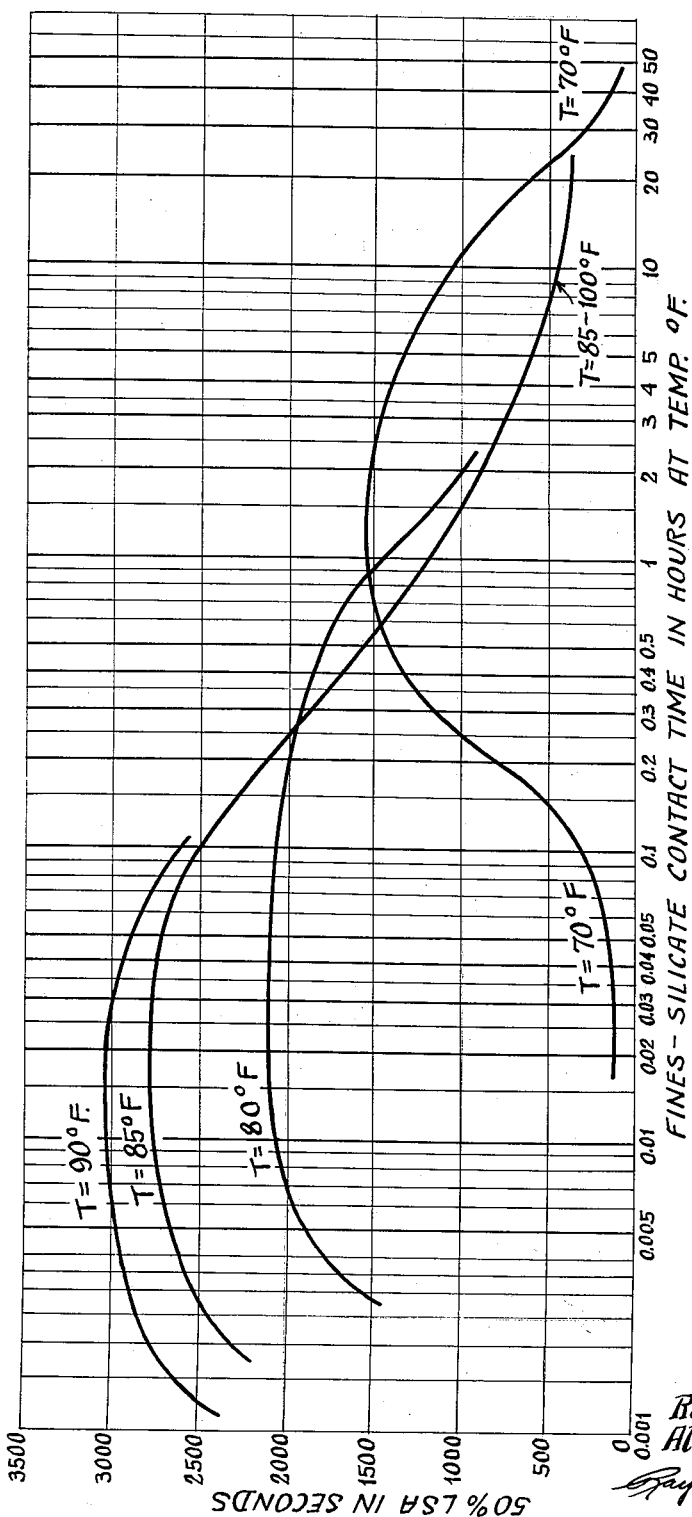

Figure 4 shows the effect of the gel powder-sodium silicate solution contact time and temperature on Lauson Shaker Attrition. It will be seen from the data of this figure that resistance to attrition of the resulting product increases to a maximum with increasing time of contact and thereafter decreases upon further prolonged contact of the gel powder and silicate solution. These data also show that as contact temperature is increased, contact time must be reduced in order to achieve maximum attrition resistance.

Figure 5:
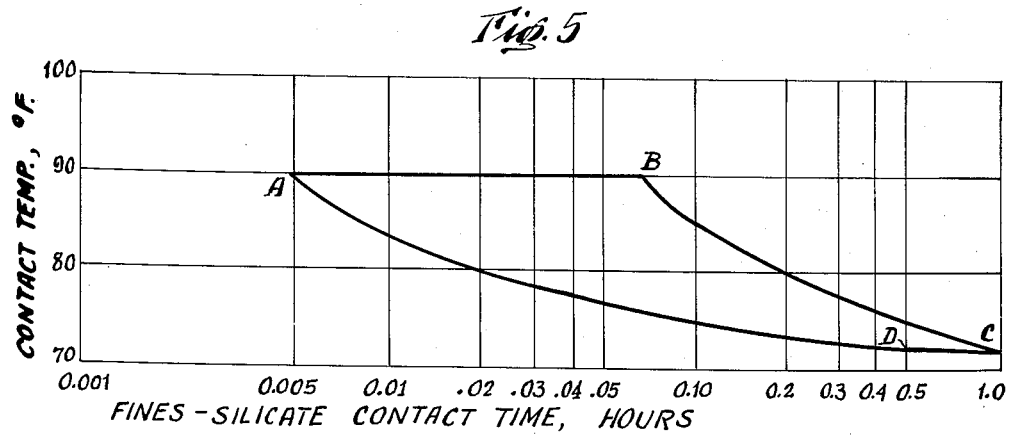

Figure 5 shows the relationship of the gel powder-sodium silicate contact time and contact temperature. In accordance with preferred embodiments of the invention, the time and temperature of contact between the introduced powder and silicate solution are correlated to lie within the area ABCD of this figure.

This application is a continuation-in-part of our co-pending application Serial No. 495,022, filed March 17, 1955, now abandoned.

We claim:

1. A method for preparing spheroidal particles of a silica-alumina gel characterized by high resistance to attrition, which comprises dispersing in sodium silicate solution an amount, based on the dried gel to be produced, of between about 15 and about 30 percent by volume of a powdered silica-alumina gel substantially insoluble therein having a weight mean particle diameter of between 2 and 4 microns, maintaining contact between said powdered gel and said silicate solution for a time of between .005 and 1 hour at a temperature in the approximate range of 70° F. to 90° F., said time and temperature being correlated to lie within the area ABCD of Fig. 5 of the accompanying drawing, thereafter mixing the resulting solution containing powder with an acidic aluminum salt solution to yield a silica-alumina hydrosol, introducing globules of said hydrosol into a column of water-immiscible liquid wherein the globules of hydrosol set to spheroidal hydrogel, effecting gelation of said spheroidal hydrosol particles and drying the resulting spheroidal particles of hydrogel at a temperature below the fusion point of said powdered gel.

2. A method for preparing an attrition-resistant silica-alumina gel, which comprises mixing between about 15 and about 30 percent by volume, based on the ultimate dried gel to be produced, of powdered silica-alumina gel having a weight mean particle diameter of between 2 and 4 microns with a sodium silicate solution characterized by a silica content in the approximate range of 5 to 30 percent by weight and a sodium oxide to silica weight ratio of between about 1/1.6 and about 1/3.8, maintaining contact between said powdered gel and said silicate solution for a time between .005 and 1 hour at a temperature in the approximate range of 70° F. to 90° F., said time and temperature being correlated to lie within the area ABCD of Fig. 5 of the accompanying drawing, thereafter effecting gelation of the resulting mixture by the addition of an acidic aluminum salt solution and drying the hydrogel so obtained at a temperature below the fusion point of said powdered gel.

3. A method for preparing a siliceous gel characterized by high resistance to attrition which comprises mixing between about 2 and about 40 percent by volume based on the ultimate dried gel to be produced of powdered silica-alumina gel having a weight mean particle diameter of between 1 and 4 microns with an aqueous sodium silicate solution, maintaining contact between said powdered gel and said silicate solution for a time of between .005 and 1 hour at a temperature in the approximate range of 70° F. to 90° F., said time and temperature being correlated to lie within the area ABCD of Figure 5 of the accompanying drawing, adding an aqueous acid-containing solution of sufficient concentration to effect gelation of the resulting mixture and drying the hydrogel so obtained at a temperature below the fusion point of said powdered gel.

4. A method for preparing a siliceous gel characterized by high resistance to attrition which comprises mixing between about 15 and about 30 percent by volume based on the ultimate dried gel to be produced of powdered silica-alumina gel having a weight mean particle diameter of between 2 and 4 microns with an aqueous sodium silicate solution, maintaining contact between said powdered gel and said silicate solution for a time of between .005 and 1 hour at a temperature in the approximate range of 70° F. to 90° F., said time and temperature being correlated to lie within the area ABCD of Figure 5 of the accompanying drawing, adding an aqueous acid-containing solution of sufficient concentration to effect gelation of the resulting mixture and drying the hydrogel so obtained at a temperature below the fusion point of said powdered gel.

5. A method for preparing spheroidal particles of a siliceous gel characterized by high resistance to attrition which comprises dispersing in an aqueous sodium silicate solution an amount based on the dried gel to be produced, of between about 2 and about 40 percent by volume of a powdered silica-alumina gel substantially insoluble therein having a weight mean particle diameter of between 1 and 4 microns, maintaining contact between said powdered gel and said silicate solution for a time of between .005 and 1 hour at a temperature in the approximate range of 70° F. to 90° F., said time and temperature being correlated to lie within the area ABCD of Figure 5 of the accompanying drawing, thereafter mixing the resulting solution containing powder with an aqueous acid-containing solution of sufficient concentration to yield a hydrosol, introducing globules of said hydrosol into a column of water-immiscible liquid wherein the globules of hydrosol set to spheroidal hydrogel, effecting gelation of said spheroidal hydrosol particles and drying the resulting spheroidal particles of hydrogel at a temperature below the fusion point of said powdered gel.

6. A method for preparing a silica-alumina gel characterized by high resistance to attrition which comprises dispersing in an aqueous sodium silicate solution, an amount based on the dried gel to be produced of between about 2 and about 40 percent by volume of a powdered silica-alumina gel substantially insoluble therein having a weight mean particle diameter of between 2 and 4 microns, maintaining contact between said powdered gel and said silicate solution for a time of between .005 and 1 hour at a temperature in the approximate range of 70° F. to 90° F., said time and temperature being correlated to lie within the area ABCD of Figure 5 of the accompanying drawing, thereafter intimately admixing said solution containing dispersed silica-alumina gel powder with an acidic aluminum salt solution to yield a silica-alumina hydrosol, effecting gelation of said hydrosol containing powdered gel and drying the resulting hydrogel at a temperature below the fusion point of said powdered gel.

7. A method for preparing an attrition resistant siliceous gel which comprises mixing between about 2 and about 40 percent by volume based on the ultimate dried gel to be produced of powdered silica-alumina gel having a weight mean particle diameter of between 2 and 4 microns with an aqueous sodium silicate solution characterized by a sodium oxide to silicate weight ratio of between about 1/1.6 and about 1/3.8, maintaining contact between said powdered gel and said silicate solution for a time between .005 and 1 hour at a temperature in the approximate range of 70° F. to 90° F., said time and temperature being correlated to lie within the area ABCD of Figure 5 of the accompanying drawing, thereafter adding an aqueous acid-containing solution of sufficient concentration to effect gelation of the resulting mixture and drying the hydrogel so obtained at a temperature below the fusion point of said powdered gel.

References Cited in the file of this patent

UNITED STATES PATENTS

| | | |
|---|---|---|
| 2,384,946 | Marisic | Sept. 8, 1945 |
| 2,487,065 | Milliken | Nov. 8, 1949 |
| 2,631,983 | Milliken | Mar. 17, 1953 |
| 2,669,547 | Shabaker | Feb. 16, 1954 |